Patented Feb. 5, 1935

1,990,018

UNITED STATES PATENT OFFICE

1,990,018

HYDROXY FLUORANTHENES

Alfred Bergdolt, Cologne-on-the-Rhine, and Fritz Ballauf, Cologne-Mulheim, Germany, assignors to General Aniline Works, Inc., New York, N. Y., a corporation of Delaware No Drawing. Application December 6, 1932, Serial No. 646,023. In Germany December 11, 1931

5 Claims. (Cl. 260—110)

The present invention relates to new fluoranthene compounds, more particularly it relates to compounds which may be represented by the probable general formula:

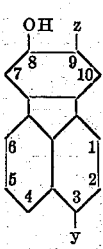

wherein $y$ stands for hydrogen or a hydroxy group, $z$ stands for hydrogen or in case $y$ stands for hydrogen $z$ stands for hydrogen or a carboxylic acid group.

Our new compounds in which $z$ stands for hydrogen are obtainable by sulfonating fluoranthene either to form the fluoranthene-3,8-disulfonic acid or the 8-monosulfonic acid and subjecting the sulfonic acids thus obtained to a caustic alkali melt, whereby the sulfonic acid groups or group are substituted by hydroxy groups or a group.

The 8-hydroxyfluoranthene-o-carboxylic acid is obtainable from the 8-hydroxyfluoranthene according to the synthesis of Kolbe by causing carbon-dioxide at elevated temperature and superatmospheric pressure in the presence of an alkali to act upon the 8-hydroxyfluoranthene.

The different fluoranthene-sulfonic acids prepared as intermediate products in the manufacture of our new compounds are obtainable by sulfonating fluoranthene under specific conditions, as is more fully described in the examples.

As a general rule it may be stated that by sulfonating fluoranthene in concentrated sulfuric acid at room temperature there is obtained a uniform fluoranthene-disulfonic acid which according to the chemical behavior of the corresponding dihydroxy compound prepared therefrom is most probably the fluoranthene-3,8-disulfonic acid.

However, when sulfonating fluoranthene in an organic solvent, such as nitrobenzene, there is obtained a mixture of two different monosulfonic acids which by melting with a caustic alkali can be transformed into a mixture of two different monohydroxyfluoranthenes. These two monohydroxyfluoranthenes can be separated by their different solubility in aqueous soda solution. The easily soluble hydroxyfluoranthene is the 4-hydroxyfluoranthene of the melting point 193° C., already known from literature, coupling with diazotized 5-nitro-o-anisidine (OCH$_3$=1) to form a red dyestuff. The difficultly soluble fluoranthene has a melting point 165° C.; it couples with 5-nitro-o-anisidine to form a brown dyestuff and is probably the 8-hydroxyfluoranthene.

The new hydroxyfluoranthenes are generally yellowish water insoluble substances of high melting points, soluble in aqueous alkalies and in organic solvents.

The new o-hydroxycarboxylic acid is a yellowish substance, soluble in organic solvents, insoluble in water and soluble in aqueous alkalies from which solutions it is precipitated by acidification.

The new hydroxy compounds as well as the new o-carboxylic acid are valuable intermediate products for the manufacture of dyestuffs, the hydroxyfluoranthenes coupling with diazo compounds, the carboxylic acid being capable of yielding carboxylic acid arylamides, suitable for producing azodyestuffs in substances or on the fibre.

The invention is illustrated by the following examples, without being limited thereto:

Example 1. 3,8-dihydroxyfluoranthene 100 grams of fluoranthene are stirred in 400 grams of sulfuric acid of 96% strength at a temperature of 0-15° C., until the fluoranthene has entered into solution. After this the mixture is poured onto ice and the sulfonic acid is precipitated with the aid of calcium hydroxide. By means of sodium carbonate the calcium salt is transformed into the sodium salt, and the solution is evaporated to dryness. The fluoranthene sodium sulfonate thus obtained is melted with 3 or 5 times its quantity of caustic soda. After cooling the melt is dissolved in water, and the dihydroxyfluoranthene is obtained by acidifying with hydrochloric acid. After recrystallizing from xylene it has the melting point 250° C. It is soluble in aqueous caustic soda lye with a yellowish coloration which, on standing in the open air, turns to green to black; by oxidation the compound is transformed into a quinoid form. This oxidation may be accelerated by the addition of an oxidizing agent, for example sodium hypochlorite lye. Due to the oxidizability of the dihydroxyfluoranthene it is supposed to be probably the -3,8-dihydroxyfluoranthene of the following constitution:

The dihydroxyfluoranthene can be transformed into other derivatives, e. g., into the dimethyl ether, by the action of a methylating agent, such as dimethylsulfate. The 3,8-dimethoxyfluoranthene has the melting point 157° C. after recrystallizing from ligroine.

The new dihydroxyfluoranthene is intended to find application in the manufacture of dyestuffs of the most various kinds.

*Example 2. 3- and 8-hydroxyfluoranthene*

200 grams of fluoranthene are dissolved in 500 ccs. of nitrobenzene. To this solution there is added a mixture of 140 ccs. of concentrated sulfuric acid and 50 grams of fuming sulfuric acid (20%), and the whole is stirred for 3 hours at 50° C. Then the nitrobenzene is distilled off with steam. The remainder is rendered alkaline by the addition of aqueous caustic soda. The hot solution is filtered and on cooling the difficultly soluble sodium salt separates. The free sulfonic acid is easily soluble in water.

240 grams of the fluoranthene sulfonic acid (sodium salt) are molten together with 1 kg of caustic potash at a temperature of 290° C. The melt is poured into water, filtered and acidified.

100 grams of the hydroxy compound thus obtained are boiled in 10 litres of a soda solution of 1½% strength, and the solution is filtered when hot. After cooling, crystals separated are filtered and redissolved; the filtrate containing soda is acidified.

The product precipitated from soda solution shows the melting point 183° C. By recrystallizing from benzene long needles are obtained which show the melting point 191–193° C. It is identical with the known 3-hydroxyfluoranthene.

The compound crystallized from the soda solution shows after recrystallizing from dilute aqueous caustic soda the melting point 145° C. After further recrystallizing from a 1½% soda solution the melting point amounts to 160° C. By recrystallization from benzene or ligroin thick prismatic crystals are obtained which show the melting point 163–165° C., and which probably represent the 8-hydroxyfluoranthene of the following formula:

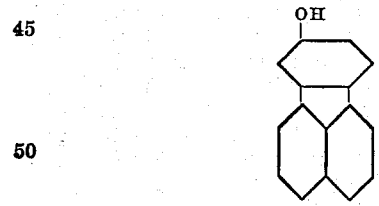

*Example 3. 8-hydroxyfluoranthene-o-carboxylic acid*

(a) 20 grams of 8-hydroxyfluoranthene of the melting point 165° C. are transformed into the potassium salt by means of 5.5 grams of potassium hydroxide and heated with 150 grams of potassium carbonate at a temperature of 210–220° C. under a carbon-dioxide pressure of 60 atmospheres for 8 hours. The product is dissolved in water and acidified. The hydroxyfluoranthene-o-carboxylic acid thus obtained of the probable formula:

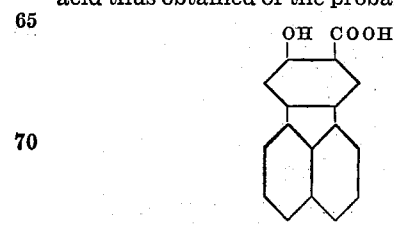

is difficultly soluble in aqueous sodium carbonate solution. For example, when dissolving 20 grams of hydroxycarboxylic acid a solution of 20 grams of sodium carbonate dissolved in 4 litres of water is necessary.

(b) 20 grams of 8-hydroxyfluoranthene are intimately mixed with 100 grams of potassium carbonate and treated for 8 hours at a temperature of 200° C. under a carbon-dioxide pressure of 60 atmospheres. The working up is that described under (a).

(c) 20 grams of 8-hydroxyfluoranthene are transformed into the sodium salt by means of 4 grams of sodium hydroxide and heated with 150 grams of calcined sodium carbonate at a temperature of 200° C. under a carbon-dioxide pressure of 60 atmospheres. The working up is that described under (a).

(d) 20 grams of 8-hydroxyfluoranthene are well mixed with 100 grams of calcined sodium carbonate and treated as described under (b).

We claim:

1. Fluoranthene compounds of the general formula:

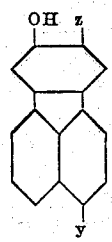

wherein $y$ stands for hydrogen or a hydroxy group, $z$ stands for hydrogen or in case $y$ stands for hydrogen $z$ stands for hydrogen or a carboxylic acid group, being generally yellowish crystalline substances, insoluble in water, soluble in aqueous alkalies, from which they are precipitated by the addition of acids, soluble in organic solvents, and being valuable intermediate products in the manufacture of dyestuffs.

2. Fluoranthene compounds of the general formula:

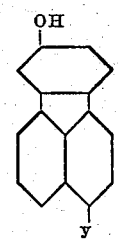

wherein $y$ stands for hydrogen or a hydroxy group, being generally yellowish crystalline substances, insoluble in water, soluble in aqueous alkalies, from which they are precipitated by the addition of acids, soluble in organic solvents, and being valuable intermediate products in the manufacture of dyestuffs.

3. 3.8-dihydroxyfluoranthene of the following formula:

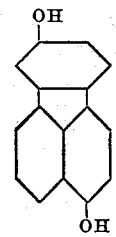

showing the melting point 250° C., being a yellowish crystalline substance, insoluble in water, soluble in organic solvents, and being a valuable intermediate product in the manufacture of dyestuffs.

4. 8-hydroxyfluoranthene of the following formula:

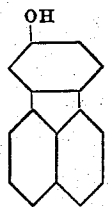

showing the melting point 163–165° C., being a yellowish crystalline substance, insoluble in water, soluble in organic solvents, and being a valuable intermediate product in the manufacture of dyestuffs.

5. 8-hydroxyfluoranthene-9-carboxylic acid of the following formula:

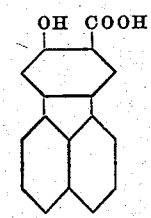

being a yellowish crystalline substance, difficultly soluble in aqueous sodium carbonate solution, and being a valuable intermediate product in the manufacture of dyestuffs.

ALFRED BERGDOLT.
FRITZ BALLAUF.